(12) United States Patent
Walton et al.

(10) Patent No.: US 6,806,826 B2
(45) Date of Patent: Oct. 19, 2004

(54) VEHICLE OBSTACLE WARNING RADAR

(75) Inventors: Eric K. Walton, Columbus, OH (US); Chi-Chih Chen, Dublin, OH (US)

(73) Assignee: The Ohio State University, Columbus, OH (US)

(*) Notice: Subject to any disclaimer, the term of this patent is extended or adjusted under 35 U.S.C. 154(b) by 0 days.

(21) Appl. No.: 10/294,507

(22) Filed: Nov. 14, 2002

(65) Prior Publication Data

US 2003/0142006 A1 Jul. 31, 2003

Related U.S. Application Data

(60) Provisional application No. 60/349,816, filed on Jan. 17, 2002.

(51) Int. Cl.[7] .......................... G01S 13/93; G01S 13/32
(52) U.S. Cl. ........................................ 342/194; 342/70
(58) Field of Search .............................. 342/70–73, 90, 342/145, 194, 195

(56) References Cited

U.S. PATENT DOCUMENTS

| | | | |
|---|---|---|---|
| 5,436,872 A | | 7/1995 | Gilmour et al. ............ 367/103 |
| 5,621,413 A | | 4/1997 | Lempkowski et al. ...... 342/117 |
| 5,768,131 A | * | 6/1998 | Lissel et al. ................ 342/109 |
| 5,874,917 A | | 2/1999 | Desodt et al. .............. 342/379 |
| 5,923,284 A | | 7/1999 | Artis et al. .................. 342/129 |
| 6,002,357 A | * | 12/1999 | Redfern et al. ............... 342/22 |
| 6,085,151 A | | 7/2000 | Farmer et al. .............. 701/301 |
| 6,198,427 B1 | * | 3/2001 | Aker et al. .................. 342/104 |
| 6,292,129 B1 | * | 9/2001 | Matsugatani et al. ......... 342/70 |
| 2001/0015698 A1 | * | 8/2001 | Tokoro ......................... 342/70 |

OTHER PUBLICATIONS

Kim, M.W., et al, "Neural Network Based Optimum Radar Target Detection in Non–Gaussian Noise.", Proceedings of the International Joint Conference on Neural Networks, Jun. 7–11, 1992.

Williams, D. A., "Millimetre Wave Radars for Automotive Applications", International Microwave Symposium Digest, Jun. 1–5, 1992.

* cited by examiner

*Primary Examiner*—Ian J. Lobo
(74) *Attorney, Agent, or Firm*—Standley Law Group LLP (57) ABSTRACT

The present invention is a radar system for detecting the presence of obstacles. The radar system includes at least one transmitting antenna and at least one receiving antenna. The transmitting antenna receives an input signal and transmits an electromagnetic wave. The electromagnetic wave reflects off an obstacle back to the receiving antenna. The receiving antenna captures the reflected electromagnetic wave and produces an output signal. The output signal is then combined with the input signal in a quadrature mixer. The resulting in-phase (I) and quadrature (Q) signals may be further processed and then transmitted to a processing system. The processing system uses a suitable algorithm, e.g., a back projection algorithm, to estimate the type and location of obstacles that reflected the electromagnetic wave. In an exemplary embodiment, the algorithm is adapted to discriminate between different sizes and locations of obstacles in order to determine if there is a hazard. Based on this information, the processing system then communicates with a visual and/or audible warning system in order to alert the driver about the obstacle if it has been determined to be a hazard.

13 Claims, 5 Drawing Sheets

VEHICLE OBSTACLE WARNING RADAR

This application claims the benefit of U.S. Provisional Application No. 60/349,816, filed Jan. 17, 2002, which is hereby incorporated by reference

BACKGROUND AND SUMMARY OF THE INVENTION

The present invention relates generally to a radar system and, more particularly, to a warning radar that may be used to detect obstacles in the path of a vehicle. Although the present invention will be described herein primarily with regard to a vehicle obstruction warning radar, it should be understood that the present invention may also be also be used in other applications. For instance, the present invention may be used in other similar or conventional applications of radars.

A driver may check his rearview mirror and sideview mirrors when backing up a vehicle. A driver may also pivot his head around to look behind the vehicle. Despite checking each of the mirrors and/or turning around, there typically is a blind spot in the driver's field of view. Compounding the problem with the blind spot, some drivers may not see properly behind the vehicle simply because they are distracted or do not exercise proper care. As a result, a driver may not see obstacles behind the vehicle when backing up. For many of the same or similar reasons, a driver may not be able to see obstacles located to the side or front of a vehicle.

In light of the difficulties with seeing obstacles when driving a car, there is a need for a radar system that detects and warns of such obstacles. There is also a need for a radar system that can accurately detect the presence of an obstacle using one or more transmitted signals of the same frequency as opposed to multiple transmitted signals having different frequencies. Furthermore, a need exists for being able to determine the presence of an obstacle without modulating the transmitted signals.

The present invention solves one or more of the aforementioned needs. The system includes at least one transmitting antenna and at least one receiving antenna. In one exemplary embodiment which includes multiple transmitting and/or receiving antennas, the receiving antennas may be arranged in at least one linear array to provide spatially distributed data to facilitate the determination of the angle and range estimates of the obstacle(s). It should be recognized that the receiving antennas may be arranged in a non-linear configuration, but a non-linear configuration may increase the difficulty of determining the angle and range estimates of the obstacles.

The transmitting antenna receives an input signal and transmits an electromagnetic wave. The electromagnetic wave reflects off an obstacle back to the receiving antenna. The receiving antenna captures the reflected electromagnetic wave and produces an output signal. The output signal is then combined with the input signal in a quadrature mixer. The resulting in-phase (I) and quadrature (Q) signals may be further processed and then transmitted to a processing system. The processing system uses a suitable algorithm (e.g., a near field back projection algorithm, a far field angle of arrival algorithm, or any other type of tomographic algorithm) to estimate the type and/or location of obstacle that reflected the electromagnetic wave. In an exemplary embodiment, the algorithm is adapted to discriminate between different sizes and/or locations of obstacles in order to determine if there is a hazard. Based on this information, the processing system may then communicate with a visual or audible display or warning system in order to alert the driver about the obstacle if it has been determined to be a hazard.

In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

The present invention is directed to a radar system for detecting the presence of obstacles. The present invention may be used to detect obstacles in the intended path of a vehicle. Examples of vehicles include cars, trucks, sport utility vehicles, motorcycles, bikes, trains, construction equipment, carts, and other similar or conventional types of vehicles. The present invention may also be used in conjunction with other types of transportation or movable objects including, but not limited to, boats, ships, submarines, planes, helicopters, and other similar or conventional types of transportation or movable objects.

Figure 1:
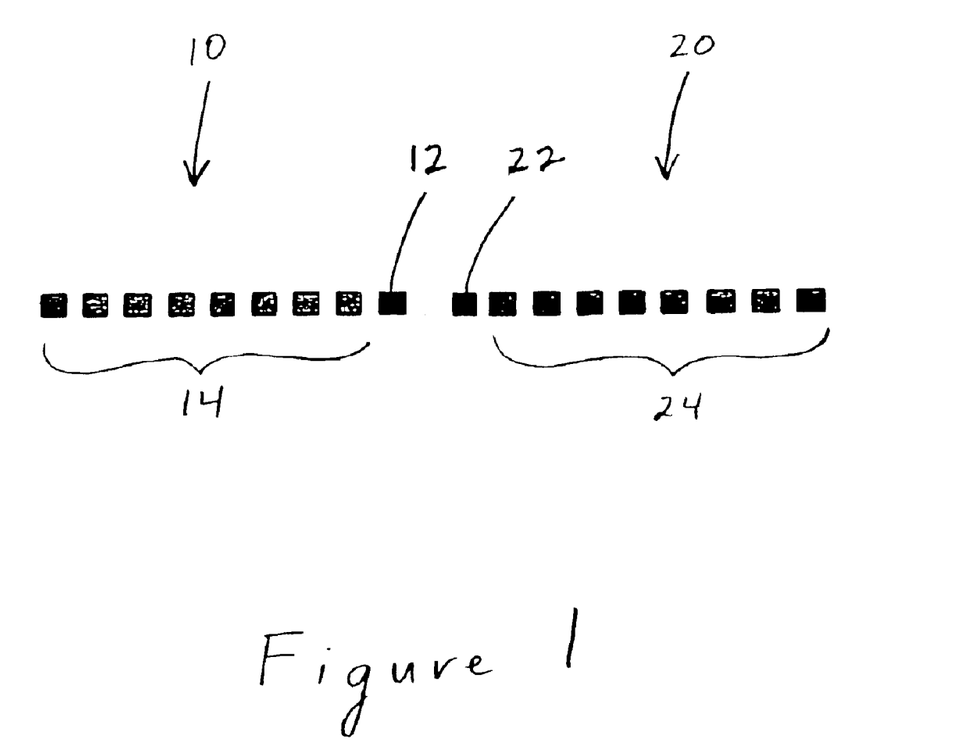
FIG. 1 is a schematic diagram of an exemplary embodiment of two arrays of transmitting and receiving antennas of the present invention.

The radar system of the present invention includes at least one transmitting antenna and at least one receiving antenna. The number and spacing of the transmitting antenna(s) and the receiving antenna(s) may be selected to achieve the desired resolution and sensitivity of the radar system. In an exemplary embodiment which includes multiple transmitting and/or receiving antennas, the receiving antennas may be arranged in at least one linear array to provide spatially distributed data to facilitate the determination of the angle, range, and type estimates of the obstacle(s). One exemplary embodiment of the radar system may include a linear array of receiving or transmitting antennas, but not both. For example, FIG. 1 shows an exemplary configuration of two linear arrays of antennas 10 and 20. Linear array 10 includes a transmitting antenna 12 and an array of receiving antennas 14, and linear array 20 includes a transmitting antenna 22 and an array of receiving antennas 24. Nevertheless, it should be recognized that some embodiments of the present invention may include a linear array of transmitting antennas and a linear array of receiving antennas.

The location of the transmitting antenna(s) relative to the receiving antenna(s) may be varied as compared to the configuration of FIG. 1. For example, a transmitting antenna may be situated at another edge of a receiving array, or a transmitting antenna may be situated above, below, or at an intermediate point in a receiving array. While the receiving antennas may be arranged in a non-linear configuration, it should be recognized that a non-linear configuration may increase the difficulty of determining the angle, range, and type estimates of the obstacles.

The number of transmitting antennas may be less than, the same as, or greater than the number of receiving antennas. An exemplary embodiment of the present invention may include at least one array of receiving antennas or at least one array of transmitting antennas. For example, the radar system may include one transmitting antenna and two arrays of receiving antennas. In one exemplary embodiment, there may be about 1 or 2 transmitting antennas per about 30 to 100 receiving antennas. However, there may be multiple arrays of transmitting antennas and only a small number of receiving antennas in another exemplary embodiment. As such, it should be recognized that the number of transmitting antenna(s) and receiving antenna(s) is theoretically unlimited.

Figure 2:
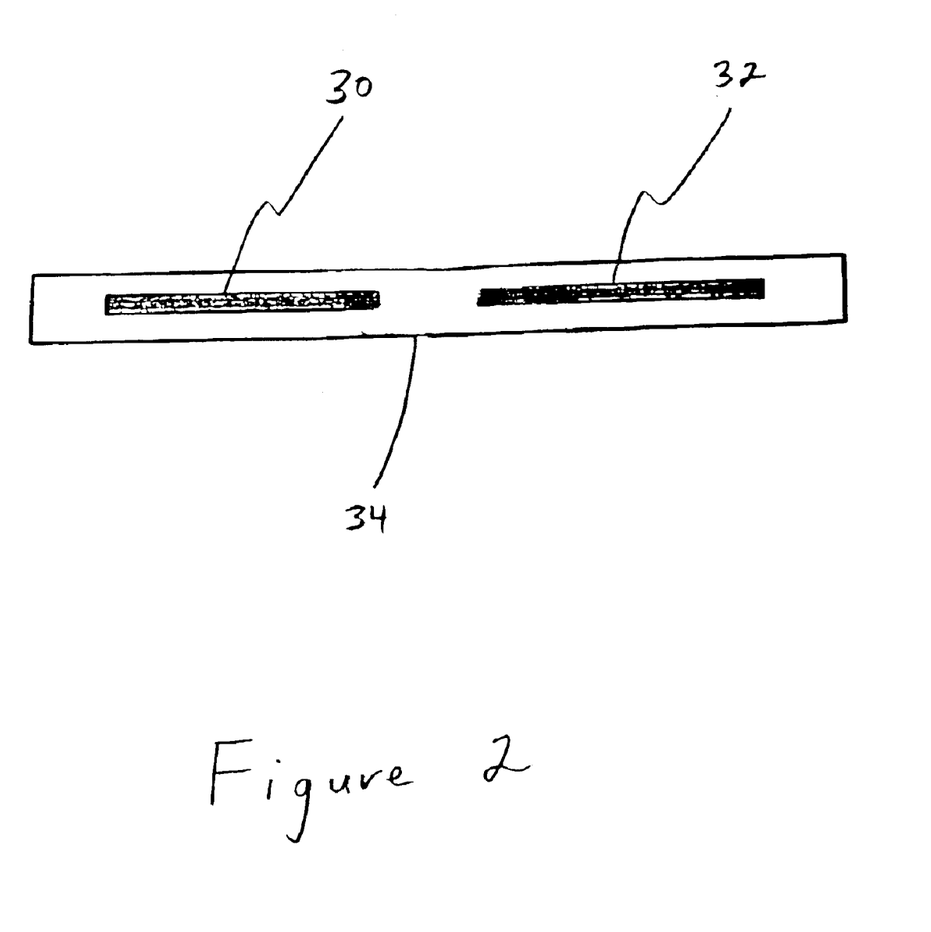
FIG. 2 is a schematic diagram of an exemplary implementation of two arrays of transmitting and receiving antennas of the present invention.
Figure 3:
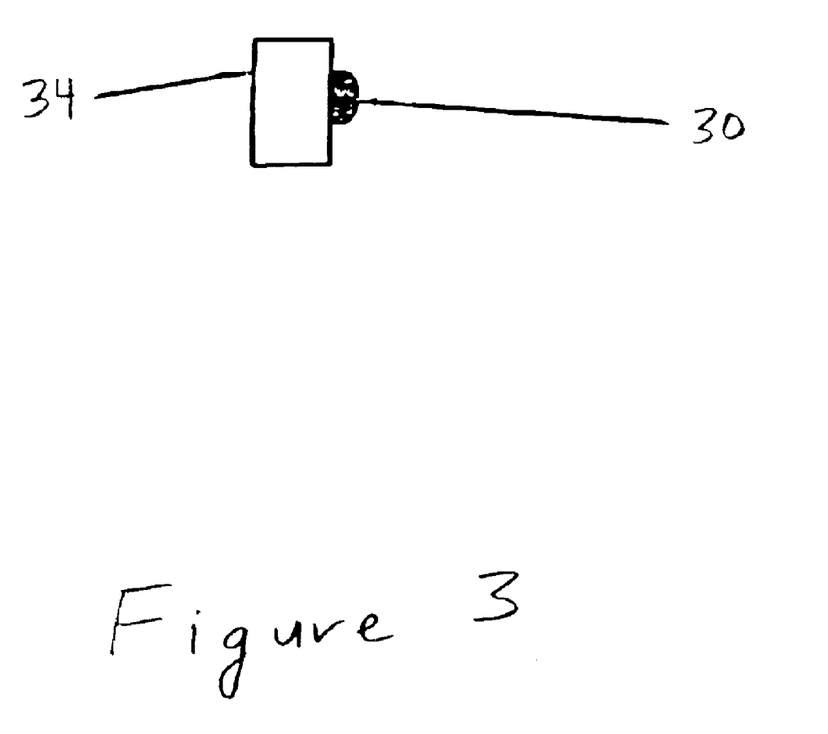
FIG. 3 is a side view of the exemplary implementation shown in FIG. 2.

An exemplary implementation of the present invention is shown in FIG. 2 and FIG. 3. In this embodiment, two arrays of transmitting and receiving antennas 30 and 32 are secured to a bumper 34 of a vehicle. In other embodiments of the present invention, the arrays may be secured to another portion of a vehicle including, but not limited to, the front or a side. The arrays may be secured to the vehicle using any suitable technique. For example, the arrays may be secured to the vehicle using adhesives and/or mechanical fastening means.

Figure 4:
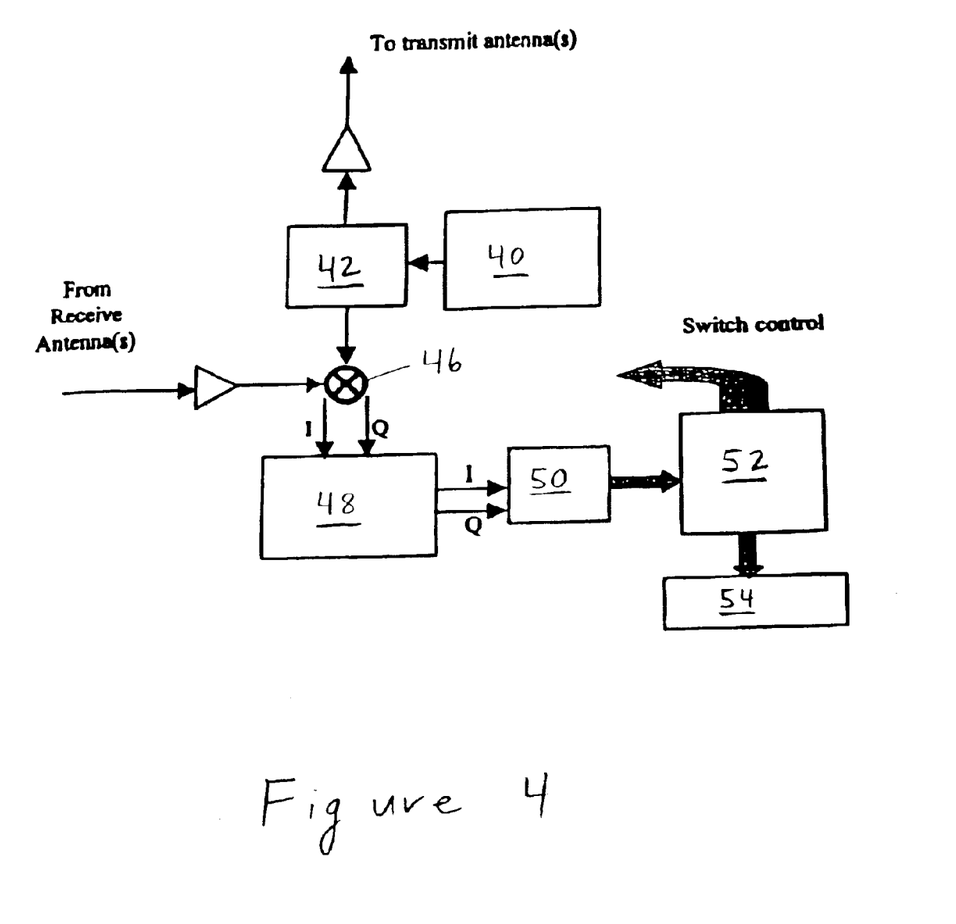
FIG. 4 is a schematic diagram of an exemplary radar system of the present invention.
Figure 5:
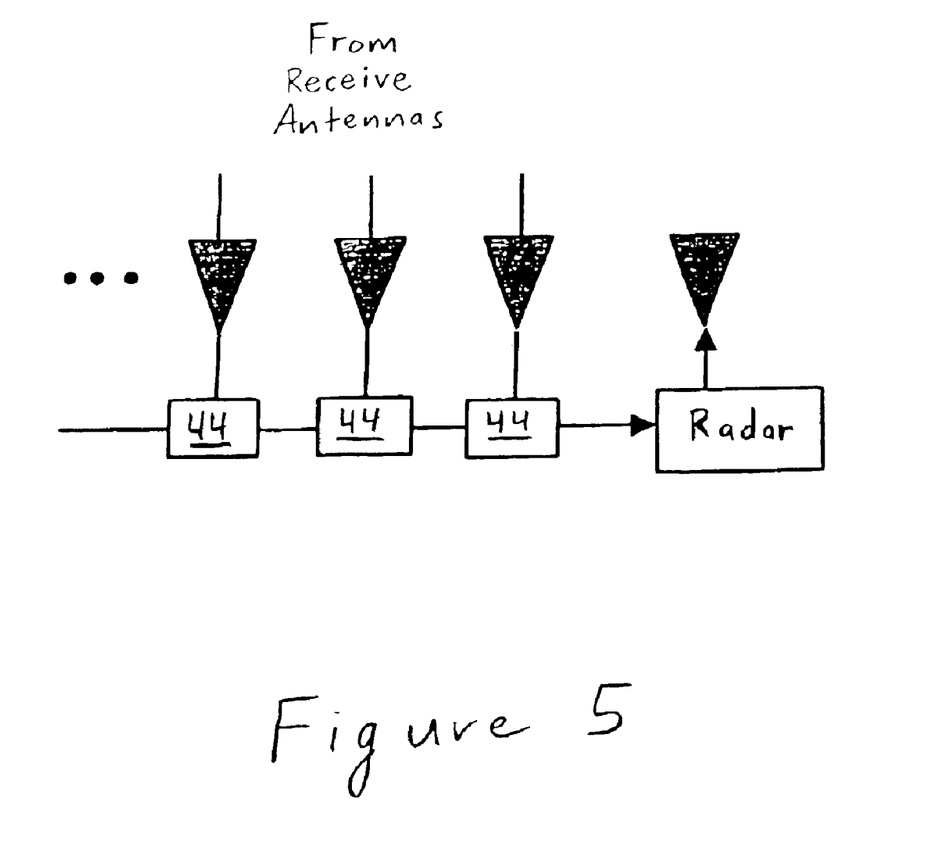
FIG. 5 is a schematic diagram of an exemplary switching architecture which may be used in the present invention.

FIG. 4 is a schematic diagram of an exemplary embodiment of the present invention. A continuous wave signal source 40 may be used to supply an input signal to at least one transmitting antenna. In the event there is multiple transmitting antennas, a power divider 42 may be utilized to deliver substantially the same input signal to each transmitting antenna. Each transmitting antenna transmits an electromagnetic wave that is adapted to reflect off an obstacle back to the receiving antennas. The receiving antennas capture the reflected electromagnetic waves and produce output signals. A switch configuration comprising a plurality of switches 44 such as shown in FIG. 5 may be utilized to facilitate the scanning of the output signals of the receiving antennas. The respective output signals are combined with the input signal in a quadrature mixer 46. The resulting in-phase (I) and quadrature (Q) signals may be further processed and then transmitted to a processing system. For example, the radar system may include at least one filter 48, e.g., a pair of low pass filters, for filtering the I and Q signals prior to the processing system. The radar system may also include at least one analog-to-digital converter 50 to facilitate electrical communication with the processing system. An example of the processing system 52 may be comprised of a processor and, optionally, a controller. The processor and the controller may be embodied in the same device or in separate devices. The controller may control the scanning of the switches 44 that are in communication with the receiving antennas. The processor may use a suitable algorithm (e.g., a near field back projection algorithm, a far field angle of arrival algorithm, or any other suitable type of tomographic algorithm) to estimate the type and/or location of obstacle that reflected the electromagnetic waves. In an exemplary embodiment, the algorithm may be adapted to discriminate between different sizes and/or locations of obstacles in order to determine if there is a hazard. For example, an exemplary embodiment of the present invention may be adapted to discriminate between various types of obstacles including, but not limited to, curbs, potholes, people, posts, other vehicles, and other various types of obstacles. In one embodiment, the size of an obstacle may be estimated by the strength of the reflected electromagnetic waves. In another embodiment, the location (e.g., distance) of an obstacle may be estimated by deriving angle and range distribution data from the I signals and the Q signals. Based on such information, the processing system 52 may then communicate with a visual or audible display or warning system 54 in order to alert the driver about the obstacle if it has been determined to be a hazard.

As mentioned above, each receiving array may be linearly disposed. The length of each receiving array and its element spacing may be selected to obtain the desired resolution and sensitivity of the resulting image. For example, the radar system may be comprised of about 30 to 100 or more receiving antennas that are linearly disposed. At each receiving antenna, the amplitude and phase of the total received signal may be measured in an exemplary embodiment of the present invention. This signal is the phasor sum of the set of signals arriving at each antenna after reflecting from the various radar scatterers in the field of view of the array. This results in an array of bistatically received signals over the region of the radar, wherein each signal is the linear phasor sum of the various scattered signals. A suitable algorithm may then be performed.

An example of the algorithm may include some or all of the following steps:

1. choosing an area to image over and divide it into a 2-dimensional array of pixels;
2. selecting each pixel in the region to be imaged;
3. phase shifting each measured signal by a phase correction derived from the bistatic distance from the transmit antenna—to the pixel—to the receive antenna;
4. determining a linear phasor sum of the set of signals;
5. determining the amplitude of the phasor sum using the contribution of the scattering from the pixel of interest;
6. repeating these steps for all of the pixels in the area to be imaged; and
7. determining an image showing the level of scattering over the domain of the area of interest.

Any suitable type of display or warning system may be utilized in the present invention to convey the appropriate message to the intended recipient, e.g., the driver of the vehicle. For instance, the processing system may communicate with an audible warning system to produce an appropriate audible sound or message. In another embodiment, the processor may communicate with a visual display to produce an image of the obstacle(s) or an appropriate text message such as "GO" or "DON'T GO". One example of a visual display is a liquid crystal display. Another example of a display is one that includes visual imagery as well as an audible sound or message.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A radar system for detecting an obstacle, said radar system comprising:

a signal source adapted to produce a single frequency, continuous wave input signal;

a transmitting antenna adapted to receive said input signal and transmit an electromagnetic wave, said electromagnetic wave adapted to reflect off said obstacle to produce a reflected electromagnetic wave;

a plurality of receiving antennas adapted to receive said reflected electromagnetic wave and produce output signals;

a quadrature mixer adapted to combine said input signal with said output signals to produce in-phase (I) signals and quadrature (Q) signals; and a processor adapted to use said I signals and said Q signals to estimate the angle and range location of said obstacle using a near field back projection algorithm or a far field angle of arrival algorithm.

2. The radar system of claim 1 wherein said transmitting antenna and said receiving antennas are secured to a vehicle.

3. The radar system of claim 2 wherein said transmitting antenna and said receiving antennas are secured to a bumper of said vehicle.

4. The radar system of claim 1 wherein said processor is adapted to use the amplitudes and phases of said output signals to estimate the location of said obstacle.

5. The radar system of claim 1 wherein said processor is adapted to estimate the distance of said obstacle.

6. The radar system of claim 1 wherein said processor is adapted to use angle and range distribution data derived from said I signals and said Q signals to estimate the location of said obstacle.

7. The radar system of claim 1 wherein each of said receiving antennas is in electrical communication with said quadrature mixer via a respective switch.

8. The radar system of claim 7 further comprising a controller in electrical communication with said processor and each of said switches, whereby said controller controls the scanning of said receiving antennas.

9. The radar system of claim 1 wherein said receiving antennas are arranged in a linear array.

10. The radar system of claim 1 further comprising at least one additional transmitting antenna adapted to receive substantially the same input signal and transmit substantially the same electromagnetic wave which is adapted to reflect off said obstacle to produce another reflected electromagnetic wave to be received by said receiving antennas.

11. The radar system of claim 10 wherein said transmitting antennas are arranged in a linear array.

12. The radar system of claim 1 wherein said I signals and said Q signals are analog signals, said radar system further comprising at least one analog-to-digital converter interposed between said quadrature mixer and said processor.

13. The radar system of claim 1 further comprising at least one filter interposed between said quadrature mixer and said processor.

* * * * *

UNITED STATES PATENT AND TRADEMARK OFFICE
CERTIFICATE OF CORRECTION

PATENT NO. : 6,806,826 B2
DATED : October 19, 2004
INVENTOR(S) : Walton et al.

It is certified that error appears in the above-identified patent and that said Letters Patent is hereby corrected as shown below:

Title page showing the illustrative figure 4 should be deleted to be replaced with the attached title page.

Drawing sheet, consisting of Figs. 1-5, should be deleted to be replaced with the drawing sheet consisting of Figs. 1-5, as shown on the attached page.

Signed and Sealed this

Twenty-eighth Day of June, 2005

JON W. DUDAS
*Director of the United States Patent and Trademark Office*

(12) United States Patent
Walton et al.

(10) Patent No.: US 6,806,826 B2
(45) Date of Patent: Oct. 19, 2004

(54) VEHICLE OBSTACLE WARNING RADAR (75) Inventors: Eric K. Walton, Columbus, OH (US); Chi-Chih Chen, Dublin, OH (US)

(73) Assignee: The Ohio State University, Columbus, OH (US)

(*) Notice: Subject to any disclaimer, the term of this patent is extended or adjusted under 35 U.S.C. 154(b) by 0 days.

(21) Appl. No.: 10/294,507

(22) Filed: Nov. 14, 2002

(65) Prior Publication Data
US 2003/0142006 A1 Jul. 31, 2003

Related U.S. Application Data (60) Provisional application No. 60/349,816, filed on Jan. 17, 2002.

(51) Int. Cl.$^7$ .................... G01S 13/93; G01S 13/32
(52) U.S. Cl. .................................. 342/194; 342/70
(58) Field of Search ...................... 342/70–73, 90, 342/145, 194, 195

(56) References Cited

U.S. PATENT DOCUMENTS

| | | | |
|---|---|---|---|
| 5,436,872 A | | 7/1995 | Gilmour et al. ............ 367/103 |
| 5,621,413 A | | 4/1997 | Lempkowski et al. ...... 342/117 |
| 5,768,131 A | * | 6/1998 | Lissel et al. ............... 342/109 |
| 5,874,917 A | | 2/1999 | Desodt et al. .............. 342/379 |
| 5,923,284 A | | 7/1999 | Artis et al. ................. 342/129 |
| 6,002,357 A | * | 12/1999 | Redfern et al. ............... 342/22 |
| 6,085,151 A | | 7/2000 | Farmer et al. .............. 701/301 |
| 6,198,427 B1 | * | 3/2001 | Aker et al. .................. 342/104 |
| 6,292,129 B1 | * | 9/2001 | Matsugatani et al. ......... 342/70 |
| 2001/0015698 A1 | * | 8/2001 | Tokoro ........................ 342/70 |

OTHER PUBLICATIONS

Kim, M.W., et al, "Neural Network Based Optimum Radar Target Detection in Non–Gaussian Noise.", Proceedings of the International Joint Conference on Neural Networks, Jun. 7–11, 1992.
Williams, D. A., "Millimetre Wave Radars for Automotive Applications", International Microwave Symposium Digest, Jun. 1–5, 1992.

* cited by examiner

*Primary Examiner*—Ian J. Lobo
(74) *Attorney, Agent, or Firm*—Standley Law Group LLP (57) ABSTRACT

The present invention is a radar system for detecting the presence of obstacles. The radar system includes at least one transmitting antenna and at least one receiving antenna. The transmitting antenna receives an input signal and transmits an electromagnetic wave. The electromagnetic wave reflects off an obstacle back to the receiving antenna. The receiving antenna captures the reflected electromagnetic wave and produces an output signal. The output signal is then combined with the input signal in a quadrature mixer. The resulting in-phase (I) and quadrature (Q) signals may be further processed and then transmitted to a processing system. The processing system uses a suitable algorithm, e.g., a back projection algorithm, to estimate the type and location of obstacles that reflected the electromagnetic wave. In an exemplary embodiment, the algorithm is adapted to discriminate between different sizes and locations of obstacles in order to determine if there is a hazard. Based on this information, the processing system then communicates with a visual and/or audible warning system in order to alert the driver about the obstacle if it has been determined to be a hazard.

13 Claims, 5 Drawing Sheets